United States Patent [19]

Fisher

[11] Patent Number: 4,628,073

[45] Date of Patent: Dec. 9, 1986

[54] SOFT, RUBBERY, MULTIPHASE MATRIX MATERIAL AND METHODS FOR ITS PRODUCTION

[75] Inventor: W. Keith Fisher, New Britain, Conn.

[73] Assignee: Monsanto Company, St. Louis, Mo.

[21] Appl. No.: 657,168

[22] Filed: Oct. 3, 1984

[51] Int. Cl.[4] .............................................. C08L 51/00
[52] U.S. Cl. ...................................... 525/70; 522/149; 522/159; 522/161; 525/164; 525/232
[58] Field of Search ............... 525/232, 164, 240, 70; 524/201; 204/159.21, 159.22

[56] References Cited

U.S. PATENT DOCUMENTS

| | | | |
|---|---|---|---|
| 2,935,763 | 5/1960 | Newman et al. | 264/101 |
| 3,000,841 | 9/1961 | Ware | 524/519 |
| 3,158,664 | 11/1964 | Baer | 525/198 |
| 3,262,997 | 7/1966 | Edwards et al. | 525/232 |
| 3,267,187 | 8/1966 | Slosberg et al. | 264/122 |
| 3,478,132 | 11/1969 | Randolph | 273/220 |
| 3,658,752 | 4/1972 | Das et al. | 524/496 |
| 4,003,408 | 1/1977 | Turner | 239/145 |
| 4,005,054 | 1/1977 | Bonnefon et al. | 524/521 |
| 4,264,490 | 4/1981 | Berejka | 525/232 |
| 4,293,461 | 10/1981 | Strazik et al. | 525/517.5 |
| 4,336,351 | 6/1982 | Cinadr | 525/211 |
| 4,352,704 | 10/1982 | Williams et al. | 156/125 |
| 4,362,840 | 12/1982 | Tabar et al. | 524/525 |
| 4,380,607 | 4/1983 | Ikeda et al. | 525/232 |
| 4,419,480 | 12/1983 | Tabar et al. | 524/525 |

*Primary Examiner*—Theodore E. Pertilla
*Attorney, Agent, or Firm*—Hall, Myers & Rose

[57] ABSTRACT

Provided is a method for producing and a soft-rubbery matrix material composed of 0.3–70 micron particles of a 50,000–300,000 molecular weight cross-linkable polymer dispersed in a fluxable elastomer where the polymer's softening point temperature exceeds the elastomer's fluxing temperature and the polymer and elastomer are combined and mixed at a temperature maintained above the fluxing temperature of the elastomer but below the softening point temperature of the polymer.

36 Claims, 5 Drawing Figures

SOFT, RUBBERY, MULTIPHASE MATRIX MATERIAL AND METHODS FOR ITS PRODUCTION

TECHNICAL FIELD

This invention relates to methods for making a soft, rubbery, multiphase material and more particularly to a cool blending process and product therefrom having a particulated, polymeric material dispersed in a fluxable, rubbery material to form a multiphase matrix material.

BACKGROUND OF THE INVENTION

Considerable research, development and production efforts have been dedicated to the manufacture of polymeric materials. Often these efforts are directed to developing polymers suited for particular purposes and having defined characteristics for achieving specific results. Selection of starting materials, compounding techniques, fabrication methods and post-fabrication activities lead to tailoring the materials for an end product. For example, differing blending techniques of identical starting material can significantly alter the end product's physical characteristics. Employing cross-linking methods during the course of manufacture also tends to present dramatic variations in the material'-properties.

Cross-linking is a shorthand term to describe the formation of a three-dimensional molecular network within a polymeric composition. Since Charles Goodyear first cross-linked rubber with sulfur, many techniques and materials have been developed and now contribute to an important technology within the field of polymer chemistry. Conventional techniques employed to effectuate cross-linking generally involve incorporation of thermally-activated, multi-functional chemical additives within a cross-linkable material and subsequently heating the material above the temperature of activation to form covalent bonds within the polymeric network. Alternatively, the polymeric material may be cured when exposed to ionizing radiation of appropriate energy.

The presence of these covalent bonds generally enhance various desirable physical characteristics of a polymeric material such as increased resistance to thermal and solvent degradation, structural strength, shelf-life retention, etc. Additionally, curing may impart new characteristics such as heat-recoverability. Thus, cross-linking permits a material to be tailored to possess specific characteristics for particular uses. Enhancement of such characteristics, however, often generates other problems. For example, the additional structural strength is generally equated to increased hardness. Therefore, cross-linked materials generally do not possess a low degree of hardness.

Difficulties often arise during fabrication of cross-linked materials by conventional methods. The additional material rigidity and strength detracts from subsequent conventional fabrication techniques such as rolling and extrusion. For example, due to increased frictional forces, an article formed by extrusion of a cross-linked polymeric material often exhibits melt fracture (crack lines along the outer surfaces). The melt fracture is induced by considerable frictional forces resulting from forcing the material, under pressure and at an elevated temperature, through a mandrel or die. These frictional forces may contain sufficient energy to overcome the energy of the covalent bonds and may result in surface roughness of the fabricated article.

On the positive side, cross-linking contributes markedly to a very desirable property shelf-life retention. Shelf-life retention of a fabricated article is that property identified as the ability of the article to preserve its shape during storage. Uncross-linked materials, particularly elastomers, generally have an extremely limited retention capacity, if any at all. For this reason, fabricated elastomeric articles must be stored in a carefully controlled environment or be used immediately so that the original article configuration remains substantially unchanged. Those articles produced from elastomeric or rubbery materials which possess some degree of shelf-life retention, often involve extended processing periods (particularly molding) to achieve measurable structural integrity and shelf-life retention. Cross-linking an elastomer partially overcomes this problem. As noted above, however, the material becomes correspondingly harder as the degree of cross-linking increases.

For example, molding periods for such materials may exceed five to ten times the period necessary for molding ordinary thermoplastics.

SUMMARY OF THE INVENTION

It is an object of this invention to overcome the aforementioned problems and retain the noted beneficial characteristics imparted to a material by cross-linking.

It is another object of this invention to provide a low hardness, soft-rubbery, easily fabricated, material having enhanced tensile strength and shelf-life retention.

An additional object of this invention is to provide a heat-shrinkable, soft-rubbery material which possesses a hardness similar to that of silicon rubbers.

Still another object of this invention is to provide a method for formulating a multi-phase dispersion of a discrete, particulated, cross-linkable polymer within an elastomeric matrix.

These and other objects are satisfied by a material including an elastomer fluxable at a particular temperature, and a cross-linkable polymer having a viscosity average molecular weight from between 50,000 and 300,000 and a softening temperature above the elastomer fluxing temperature, the polymer being in the form of discrete 0.3 to 70 microns particles distributed within the elastomer.

The objects are further satisfied by a method for making a soft, rubbery material including an elastomer with a determinable fluxing temperature and discrete polymeric particles, the polymer having a softening point temperature in excess of the fluxing temperature of the elastomer and the particles having particular morphology, the method including the steps of combining the elastomer and the discrete polymer particles and mixing the elastomer and polymer particles at a temperature maintained above the fluxing temperature of the elastomer but below the softening point of the polymer in a manner whereby the polymer is dispersed within the elastomer and substantially retains its original morphology.

This invention resulted from an investigation for achieving a method for blending an irradiation cured polyethylene and an elastomer to yield a material having enhanced physical characteristics. Analysis of the test results determined that mere blending, formation of a homogeneous composition of the elastomer and polymer, did not register any significant enhancement of the desirable physical properties. However, the investigation led to a "cool" mixing method by which discrete, cured, polyethylene particles (viscosity average molecular weight 50,000–300,000) were dispersed within an elastomer in a manner to prevent significant alteration of the morphology of the particles.

The method involved incorporation of dry, particulated (0.3–70 micron), free-flowing, polymeric material. The temperature was maintained below the softening point of the polymer particles which were uniformly dispersed within the softened elastomeric matrix to form a heterogeneous material. More simply stated, the resulting material is a soft, rubbery elastomer with organic filler of substantially unmodified morphology and which exhibits desirable enhanced physical properties. In contrast to "unfilled" elastomers and blends, the two-phase material of the present invention possessed low hardness, increased tensile strength, high gel content, and increased shelf life.

Surprisingly, the two-phase matrix material was discovered to be processable with conventional equipment employing conventional fabrication techniques generally associated with uncross-linked polymers. As already noted above in the discussion relating to shelf-life retention, organic elastomers generally require lengthy fabrication times in order to impart a reasonable shape stability. If not subjected to extended molding, articles will lose their configuration relatively quickly. Cross-linking will prevent shape instability but generates other fabrication problems such as the development of melt fracture. This invention provides a method and material which reduce the necessary production time and corresponding production costs generally associated with fabrication of soft, rubbery materials by providing a material fabricable in periods generally comparable with those of ordinary thermoplastics.

In addition to those considerations identified above, another surprising aspect of this invention is that the matrix material exhibits heat-shrink memory upon appropriate processing if at least one of the components is cross-linked. Thus, this invention provides a soft, rubbery material having enhanced physical characteristics, that is capable of easier fabrication than comparable soft, elastomeric materials and may possess heat-shrink memory.

These aspects and others of the invention will become obvious to one of ordinary skill in the art upon review of the following description of the preferred embodiments.

DETAILED DESCRIPTION OF THE PREFERRED EMBODIMENTS

Figure 1:
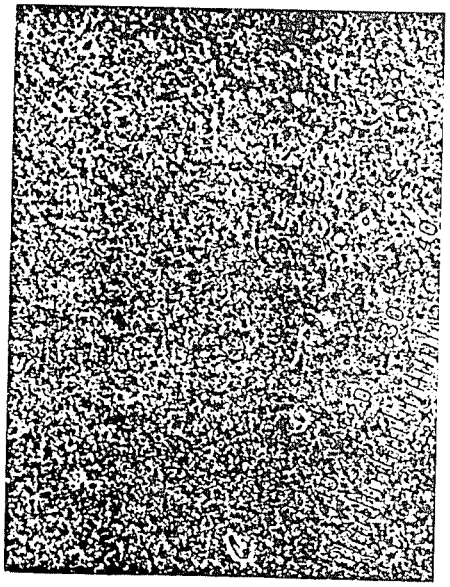
FIG. 1 is a photomicrograph of Composition 6 representing prior art material made by prior art methods.

This invention stems from an investigation of methods for blending cross-linked or activated polyethylene with an elastomer in a manner to provide enhanced material properties. It was determined that blending of cross-linked polymers with an elastomer did not contribute to the enhancement of desirable physical properties. However, uniformly dispersing discrete particles of a cross-linkable polymer in ah elastomeric matrix using a "cool blending" technique preserves the morphology of the polymer.

The elastomer selected for use in this invention may or may not be cross-linkable. The elastomer may be natural or synthetic rubbers such as gutta percha, polybutadiene, polyisoprene, styrene-butadiene rubber, or multiply unsaturated rubbers, Ethylene Propylene Diene Monomer (EPDM) rubber, Conjugated Diene Butyl (CDB) rubber, etc., or blends or admixtures thereof. The primary requirement of the elastomer is that it possesses a fluxing temperature below the softening temperature of the below-defined polymer. This requirement does not significantly reduce the range of choices as usually elastomers do possess relatively lower fluxing temperatures than softening temperatures of slightly elastomeric or non-elastomeric polymers.

The elastomer may contain additional agents such as antioxidants, pigments, thermal and/or radiation cross-linking promoters. It is preferred that the elastomer (with or without additives) be capable of compounding with conventional equipment and conventional techniques. Whichever equipment and technique is selected, it is necessary that the elastomer soften sufficiently, i.e. exhibit reduced viscosity, below 75° C. for dispersing particulated matter therein.

Polymer as used in this description is intended to generically define a cross-linkable organic composition which can be a homopolymer, copolymer, graft copolymer, blend, etc. Preferably, the polymer has an average molecular weight (50,000–300,000, average viscosity molecular weight). So long as the polymer is capable of possessing a substantially stable morphology, possesses an average molecular weight between 50,000 and 300,000 and has a softening point or crystalline transition temperature in excess of the fluxing temperature of the elastomer, it may be used in the practice of this invention. For the practice of this invention, the polymer is contemplated as being 0.3 to 70 microns. The geometric configuration of the particles may be spherical, polyganol, cylindrical, etc. However, due to practical limitations of comminution techniques for particles of this diminutive size, a spherical particle configuration is preferred. The preferred physical state of the polymer particles is 15–25 micron spheres. This physical state yields free-flowing particles and both increases the ease of handling and degree of incorporation within the fluxing elastomer. In order to prevent morphological changes to the polymer particles due to solvolysis, a solvent vehicle for incorporating the particles into the elastomer is highly undesirable. Moreover, use of a solvent carrier in the practice of this invention may reduce the ultimate uniformity of the matrix material and, therefore, is further undesirable. The contemplated physical form of the polymer, diminutive particles, additionally prevents solvent contamination of the matrix material because the particles are easily dried which eliminates residual solvent and its undesirable effects upon incorporation into the elastomer.

The chemical characteristics of the polymer particles govern many of the properties of the matrix material. More particularly, cross-linking of the polymer considerably modifies the matrix material. Cross-linking may be achieved by incorporation of thermal cross-linking promoters such as those disclosed by Strazick et al in U.S. Pat. No. 4,293,461 during the formulation of the polymer before it is comminuted. Alternatively, cross-linking may be effectuated by conventional irradiation methods where the polymer is exposed to high-energy ionizing radiation. In the case of irradiation induced cross-linking, cross-linking promotion agents commonly known as prorads may also be employed. In the context of process systemization, irradiation induced cross-linking affords greater flexibility during production because it may be accomplished during any step of the production process. In contrast, a thermal curing system requires the completion of cross-linking before comminution, or at least prior to combining the polymer and elastomer. Therefore, when a cross-linked polymer component is desired, high-energy ionizing radiation induced cross-linking is the preferred practice of this invention.

Numbering among the irradiation induced cross-linked polymers, the preferred polymeric composition is an "activated vated polyolefin". The term "activated" for the purposes of this disclosure represents a polyolefin, such as polyethylene, which has been exposed to high energy, ionizing radiation in an oxygen containing atmosphere. It is preferred that the polymer be sufficiently permeable to allow oxygen diffusion to free radical sites generated by the irradiation. This treatment generates peroxide moieties along the polymer backbone which will subsequently induce cross-linking when the material is subjected to temperatures in excess of approximately 75° C.

A preferred polymer of activated polyolefin is irradiated 20 micron particles of low density polyethylene (LDPE). This material possesses adequate oxygen permeability. Also, when in the form of 15-25 micron spheres is physically of a size to permit sufficient oxygen flow around the particles permitting generation of a substantially uniform concentration of peroxide groups on the polymer. To provide adequate peroxide concentration in an atmospheric environment, a quantity and rate of radiation (2-10 Mrads at a 200 rad/sec-1 Mrad/sec rate) is required. Once the peroxide groups form (as a result of diatomic oxygen bonding to the free radical sites), cross-linking of the low density polyethylene can be effected by exposure to high or low energy radiation such as temperatures in excess of 75° C.

The method contemplated for combining the elastomer and polymer is "cool" blending. Although a misnomer because the method does not form a "blend" in the conventional sense, the method contemplates incorporating the polymer into the elastomer to produce a two-phase material. The elastomer is first placed into a blender or preferably a low temperature Banbury mixer and masticated to reduce its viscosity. The particulated polymer is then added to form a uniform, heterogeneous dispersion. The maximum permissible temperature attained in the mixer must fall between the initial fluxing temperature of the elastomer and the softening point temperature of the polymer. By this route, not only may a heterogeneous dispersion be achieved but also the morphology of the polymeric particles is substantially preserved. In practice, it is preferred to masticate the elastomer to a temperature of approximately 75° C. to reduce its viscosity, and then add the particulated free-flowing polymer. The upper temperature limit of 75° is critical when peroxide "activated" polyolefin is employed because temperatures in excess of 75° C. will activate the peroxide groups and prematurely induce cross-linking prior to fabrication of the material into a desired configuration.

This low temperature compounding technique insures the formation of a multi-phase material of which at least one component thereof can be cross-linked. For example, the polymer component may be cross-linked before addition to the elastomer. Also, the elastomer may be cross-linked by the addition of a promoter and subsequent thermal or irradiation curing. Therefore, the invention contemplates four potential cross-linked combinations of a two component matrix material; i.e., cross-linked polymer/cross-linked elastomer, cross-linked polymer/uncross-linked elastomer, uncross-linked polymer/cross-linked elastomer and uncross-linked polymer/uncross-linked elastomer. All of these combinations except the last, exhibited heat-shrink memory upon being rendered dimensionally heat unstable. The degree of shape memory is contingent upon the degree of cross-linking of the various components. Increased cross-linking proportionally enhances the degree of shape memory. Therefore, the most pronounced degree of shape memory is exhibited by a matrix material composed of both cross-linked elastomer and cross-linked polymer. It has also been determined that as little as 5% by weight of the polymer phase material may be incorporated into the rubber matrix by the "cool" blending technique to impart certain of the desirable material properties realized from this invention. However, in the preferred embodiments, the matrix is composed of 30-70% by weight of particulated polymer and 30-70% by weight elastomer. Most preferred, as indicated by the below defined compositions is 40-60% elastomer and 35-55% particulated polymer.

The following examples of Compositions 1-21 and evaluation of certain properties thereof are presented for purposes of illustration and comparison. The range of starting materials and post-mixing treatments underscore the breadth of components subjectable to the "cool blending" methods. With the exception of composition #6 in Table 1, all of the compositions were formulated by the "cool blending" method. Composition #6 was formulated by conventional "hot" blending. The elastomeric composition is Conjugated Diene Butyl (CDB) rubber manufactured by Exxon Chemical Co. The polyethylene used is low density United States Industrial Resin FN510 in the form of 20 micron diameter spherical particles. Certain formulations illustrate the inclusion of cross-linking promotion agents such as solid melamine condensate made in accordance with the above-referenced Strazick patent.

"Cool Blending" was effected by charging the indicated quantity of particulated low density polyethylene (LDPE) into a banbury mixer with the appropriate quantity of rubber such as CDB and mixing the materials at a temperature not exceeding 75° C. Preferably, the rubber component is first masticated to 75° C. in the mixer whereupon other ingredients and the polymer components are added in a manner and mixed for a sufficient time to produce a uniform dispersion.

The materials generated from the "melt mixing/cool blending" technique were fabricated into 125 mil (⅛") thick plaques by the following four techniques, (1) low temperature (80° C.) extrusion (ELT), (2) high temperature (177° C.) extrusion (EHT), (3) molding/pressing at 200° C. for 10 minutes (ELT C-10), and (4) compression molding at 204° C. for 10 minutes (ELT C-M).

The following tables summarize the components and properties of Compositions 1-21:

TABLE 1

| Composition | 1 (FIG. 2) | 2 | 3 | 4 (FIG. 3) | 5 (FIG. 4) | 6 (Hot) (FIG. 1) |
|---|---|---|---|---|---|---|
| CDB (wt %) | 60 | 60 | 60 | 60 | 47 | 60 |
| LDPE (wt %) | 40 | 40 | 40 | 40 | 53 | 40 |
| Premix LDPE Irradiation Dose in Mrads | 0.0 | 1.0 | 5.0 | 20.0 | 5.0 | 0.0 |
| % Gel (Hot) | | | | | | |
| ELT | 0.00 | | | 0.0 | — | — |
| EHT | — | 0.0 | 0.0 | 0.0 | — | — |
| ELT, C-10 or C-M | — | 0.0 | — | 0.0 | — | — |
| % Gel (Room Temp.) | | | | | | |
| ELT | | | | | — | |
| EHT | 58.4 | 63.8 | 72.0 | 0.0 | 62.3 | |
| ELT (C-10 or C-M) | — | 33.7 | — | 0.0 | 88.6 | |
| Tensile at Break (PSI) | 312 | 363 | 425 | 82 | 592 | 234 |
| % Elongation | 454 | 754 | 550 | 2423 | 233 | 189 |
| Tension Set | — | 13.3 | | 16.7 | 135 | |
| Shore Hardness | 74A | 71A | 76A | 48A | 71A | 71A |
| Shelf life retention % | — | — | | | | |

TABLE 2

Incorporation of cross-linking promoter into rubber

| Composition | 7 (FIG. 5) | 8 | 9 | 10 | 11 |
|---|---|---|---|---|---|
| CDB (% wt) | 57 | 57 | 57 | 57 | 95 |
| LDPE (% wt) | 38 | 38 | 38 | 38 | — |
| Melamine Solids (% wt) | 5 | 5 | 5 | 5 | 5 |
| Premix LDPE Irradiation Dose in Mrad | 0 | 1.0 | 5.0 | 20 | — |
| % Gel (Hot) | | | | | |
| ELT | 0.0 | 0.0 | 0.0 | 54.8 | 0.0 |
| EHT | 37.1 | 32.6 | 34.8 | 67.3 | — |
| ELT, C-10 or C-M | 41.4 | 46.7 | 59.4 | 83.1 | 87.9 |
| % Gel (Room Temp.) | | | | | |
| ELT | 86.0 | 75.9 | 50.0 | — | 0.0 |
| EHT | 93.3 | 88.2 | 84.8 | 78.0 | 57.8 |
| ELT C-10, C-M | — | — | — | 90.3 | 75.0 |
| Tensile at Break (PSI) | 431 | 619 | 687 | 199 | — |
| % Elongation | 170 | 263 | 239 | 712 | — |
| % Tension Set | 6.55 | 5.73 | 4.20 | 1.97 | — |
| Shore Hardness | 75A | 74A | 72A | 58A | 27A |
| Shelf life retention | 94 | 98 | 90 | 92 | |

TABLE 3

"Cool Blend" subjected to irradiation subsequent to mixing without cross-linking promoters

| Composition | 12 | 13 | 14 | 15 | 16 |
|---|---|---|---|---|---|
| CDB (wt %) | 47 | 47 | 47 | 47 | 47 |
| LDPE (wt %) | 53 | 53 | 53 | 53 | 53 |
| Blend Dose in Mrad | 0 | 0.5 | 2.5 | 10 | 20 |
| Tensile at Break (PSI) | 478 | 613 | 679 | 806 | 942 |
| % Elongation | 102 | 153 | 230 | 282 | 320 |
| Shore Hardness | 85A | 88A | 88A | 89A | 87A |

TABLE 4

"Cool Blend" subjected to irradiation subsequent to ionizing with cross-linking promotion agent

| Composition | 17 | 18 | 19 | 20 | 21 |
|---|---|---|---|---|---|
| CDB (% wt) | 44.6 | 44.6 | 44.6 | 44.6 | 44.6 |
| LDPE (% wt) | 50.4 | 50.4 | 50.4 | 50.4 | 50.4 |
| Melamine Solid (% wt) | 5 | 5 | 5 | 5 | 5 |
| Blend Dose in Mrad | 0 | 0.5 | 2.5 | 10 | 20 |
| Tensile at Break | 667 | 726 | 670 | 833 | 974 |
| % Elongation | 225 | 354 | 129 | 208 | 259 |
| Shore Hardness | 91A | 90A | 89A | 89A | 89A |

Table 1 includes several cool blended fomulations incorporating "activated" polyethylene particles which have been exposed to increasing dosages of irradiation (and therefore an increasing peroxide concentration). Composition 6, in table 1, was formulated by conventional "hot blend" techniques and is included for comparative purposes.

The physical properties of the compositions were evaluated for certain characteristics. The testing included measurement of tensile strength at break, percent elongation at break, and tension set (which is inversely proportional to the materials elastic response). All testing was conducted at room temperature. The tensile stress and percent elongation tests were measured using compression molded tensile bars conforming to ASTM-D638-IV, on an Instron tensile test device at a crosshead speed of 10 inches/minute. Tensile set analysis resulted from stretching a sample strip of 2 inches ($l_0$) to a length of 3 inches ($l_1$) at a rate of 1 inch/minute and held at 1, for ten minutes. The length (l) of the sample, after release, was then measured and the percent tension set calculated according to the following formula:

$$\text{Tension Set (\%)} = \frac{l - l_0}{l_1 - l_0} \times 100$$

Shore Hardness was determined by measurements with a Shore A Durometer in accordance with standard techniques.

Lastly, the property of shelf-life retention, a quantity of significant interest for heat recoverable materials, was determined. The importance of shelf-life retention rests on the ability of the material to maintain a dimensionally heat-unstable configuration after fabrication but before use. The test conforming to ASTM D 2671, except the samples were compression molded strips instead of tubes, involved heating the material to its softening point temperature (110° C.), deforming and cooling the material which then retains its deformed state. The length of the material is measured immediately ($l_d$) and then again after two weeks of storage at 40° C. (l). The calculation was made according to the following formula:

$$\text{Shelf-life retention (\%)} = \frac{l}{l_d} \times 100$$

Table 2 represents compositions including "activated" (cross-linked polymer particles and a cross-linking promoter in the rubber matrix. The same tests performed on Compositions 1-6 were employed to evaluate compositions 7-11. Composition 11, containing only elastomer and cross-linker, is included for comparative purposes only.

The incorporation of the cross-linking promoting melamine solids into the matrix yield extrudents having smooth, glossy surfaces and which were both heat-recoverable and heat-fusible. Thus, this invention is applicable to the heat-shrink memory art.

In contrast to the results obtained from compositions 1–5, the % Gel tests obtained from Compositions 7–10 indicate that the matrix of these compositions possessed a relatively high degree of cross-linking which, in turn, represents enhanced solvent resistance. It was also determined that these compositions were processable into transparent films the surface tack of which varied with the irradiation dosage of the polymer component.

Comparing the % Tension Set of Composition 9 and 10 with 4 and 5, it is clear that cross-linking of the elastomer imparted greater elasticity in response to strain than no or little cross-linking. Also, the tensile at break of the melamine containing composition was generally greater than those without.

Composition 10 exhibited high Shelf-Life retention, low hardness and low % Tension Set. This is an unusual combination of characteristics which renders this particular composition unique and capable of heat-shrinking applications heretofore unknown for such a soft material. The tensile strength of Composition 10 radically differs from those compositions employing less highly cross-linked polymeric filler. The difference is probably based on contrasting morphologies due to the highly cross-linked polyethylene particles surviving the mixing step with a minimum amount of deformation.

Tables 3 and 4 present compositions incorporating "unactivated" (non-cross-linked) polyethylene as part of the matrix material. The resulting compositions were subjected to increasing dosages of high energy ionizing radiation. The compositions of Table 4 (17–21) include the melamine cross-linking promotion agents which are not present in Compositions (12–16). Apparently, the results indicate that the inclusion of the promoter does not significantly alter the physical characteristics of the blends. However, these compositions do demonstrate the unusual characteristic of possessing increasing Tensile Strength and % Elongation. The increase in both measurements contrasts with those expected because conventional materials reflect an inverse relationship between the two. Indeed, the dual enhancement of both Tensile Strength and Elongation is so unusual that it cannot be explained at this time. As noted above, Compositions 17–21, comprising uncross-linked polymer and cross-linked elastomer, also exhibit heat-shrink memory when heated, deformed and then cooled in the deformed state.

Figure 2:
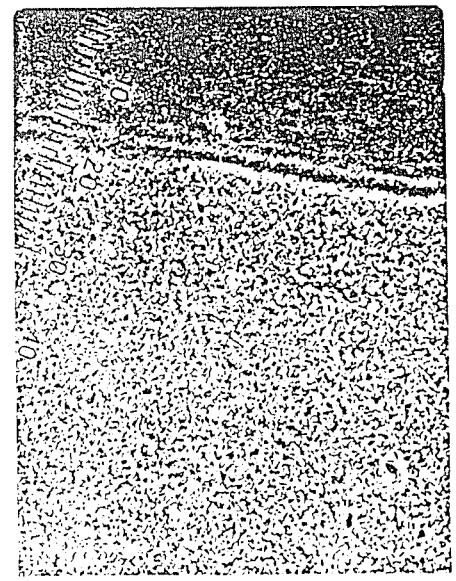
FIG. 2 is a photomicrograph of Composition 1.

FIGS. 1–5 are photomicrographs which pictorially demonstrate the decidedly different morphologies of the compositions formulated in accordance with this invention in contrast to the prior art. FIG. 1 illustrates, at 150 power, "hot blended" composition 6. FIG. 2 is a photograph of Composition 1 magnified 150×. Clearly, the material in Composition 1 is granier (i.e. composed of discrete dispersed particles) than the homogenized material of FIG. 1.

Figure 3:
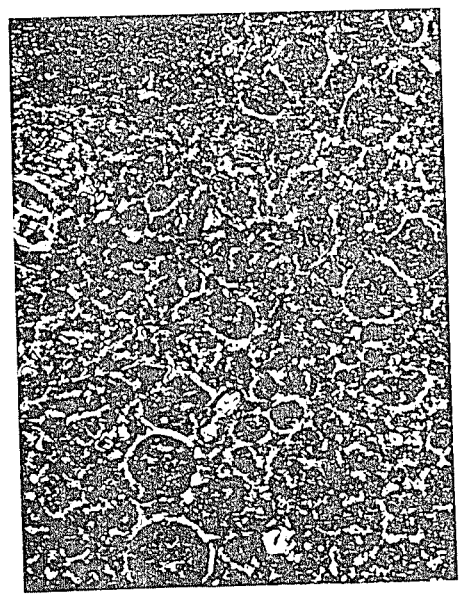
FIG. 3 is a photomicrograph of Composition 4.
Figure 4:
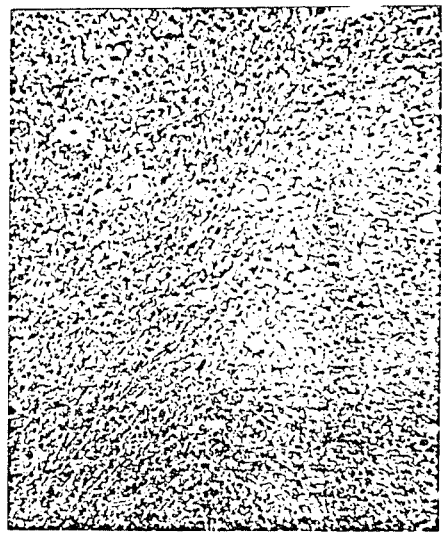
FIG. 4 is a photomicrograph of Composition 5.
Figure 5:
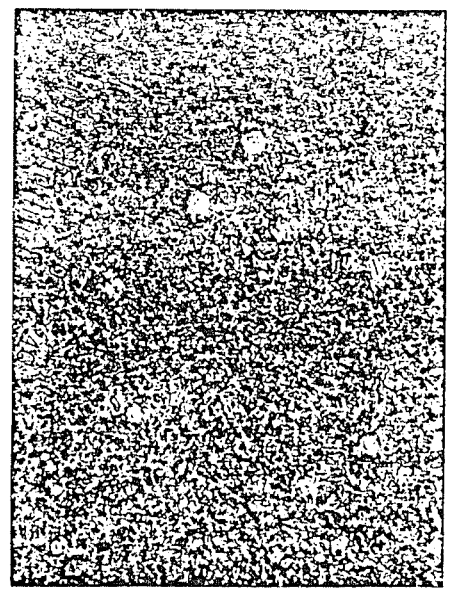
FIG. 5 is a photomicrograph of Composition 7.

FIGS. 3–5 (photomicrographs of 300 power) are presented to demonstrate the morphological differences in the materials of various compositions 3, 4 and 5. The discrete polymeric particles are easily viewed in FIG. 3 which indicates that the greater the premixing cross-linking, in this case irradiation, the higher the degree of preservation of the original morphology.

FIG. 4, representing Composition 5, depicts a discrete polymer phase in an elastomeric matrix although it is not as pronounced as in Composition 4. Composition 7 does not include any cross-linked polymeric components. The degree of phase boundary separation is less pronounced when contrasted with Composition 4. This result indicates that although in Composition 7 phase separation is preserved, the physical forces associated with mixing shear distort the uncross-linked polymeric particulated component.

In view of the foregoing modifications, improvements and alterations of the invention should be obvious by way of routine experimentation to one of ordinary skill in the art. Such modifications, alterations and improvements are contemplated to fall within the scope and intention of the following claims:

I claim:

1. A soft, rubbery composition of matter, comprising:
   (a) an elastomer selected from the group consisting of natural rubbers, synthetic organic rubbers, gutta percha, polybutadiene, polyisoprene, styrene-butadiene rubber, multiply unsaturated rubber, ethylene propylene diene monomer rubber, conjugated diene-butyl rubber, and blends or admixture thereof, where the elastomer has a determinable fluxing temperature and where the viscosity of said elastomer is sufficiently reduced at said fluxing temperature for incorporating polymer particles therein; and
   (b) a cross-linkable polymer selected from the group consisting of cross-linkable organic hompolymers, copolymers, graft copolymers and blends thereof and having an average viscosity molecular weight between 50,000 and 300,000, said polymer existing an discrete 0.3 to 70 micron particles distributed within said elastomer and said polymer having a softening temperature in excess of said fluxing temperature.

2. A soft, rubbery composition according to claim 1 wherein said matrix material includes not less than approximately 5 weight percent and not more than 70 weight percent of said polymer particles.

3. A soft, rubbery composition according to claim 2 where said polymer is at least partially cross-linked.

4. A soft, rubbery composition according to claim 3 where said polymer is cross-linked by means of ionizing radiation.

5. A soft, rubbery composition according to claim 4 where said polymer includes peroxide moieties along the polymer backbone.

6. A soft, rubbery composition of matter according to claim 2 where said elastomer is cross-linked.

7. A soft, rubbery composition according to claim 6 further including a cross-linking promoter incorporated within the elastomer phase.

8. A soft, rubbery composition according to claim 7 where said cross-linking promoter is thermally activated.

9. A soft, rubbery composition according to claim 7 where said cross-linking promoter is activated by ionizing radiation.

10. A soft, rubbery composition of matter according to claim 7 further including an unsaturated condensate of a methylolmelamine, an acrylamide, and ethylenically unsaturated fatty acid amide and a $C_1$ to $C_{10}$ alcohol wherein the methylolmelamine has at least 5 methylol groups per melamine ring, wherein substantially all the methylol groups are condensed with the acrylamide, the unsaturated fatty acid amide or the alcohol, wherein the number of acrylamide moieties of the condensate range from about 1 to about 4 per melamine ring and the number of unsaturated fatty acid amide moieties is in the range of about 0.5 to about 2 per melamine ring, wherein the ratio of the acrylamide moieties to unsaturated fatty acid amide moieties is in the range of about 1:1 to about 3:1 and wherein the unsaturated fatty acid amide is an amide of ammonia or methylamine and an ethylenically unsaturated fatty acid containing from 4 to 32 carbon atoms and at least one allylic hydrogen atom per fatty acid moiety.

11. A soft, rubbery composition according to claim 2 where said polymer is a polyolefin.

12. A soft, rubbery composition according to claim 11 where said polymer is polyethylene.

13. A soft, rubbery composition according to claim 5 where said polymer is polyethylene.

14. A soft, rubbery composition according to claim 2 where said elastomer is cross-linkable.

15. A soft, rubbery composition according to claim 14 where said elastomer is a conjugated diene butyl rubber.

16. A soft, rubbery composition according to claim 14 where said elastomer is cross-linked.

17. A soft, rubbery composition according to claim 10 where said elastomer is cross-linkable.

18. A soft, rubbery composition according to claim 17 where said polymer is polyolefin.

19. A soft, rubbery composition according to claim 17 where said polyolefin has peroxide moieties on the polymer backbone.

20. A method for producing a soft, rubbery material including an elastomer selected from the group consisting of natural rubbers, synthetic organic rubbers, gutta percha, polybutadiene, polyiosprene, styrene-butadiene rubber, multiply unsaturated rubber, ethylene propylene diene monomer rubber, conjugated diene butyl rubber, and blends or admixtures thereof where the elastomer has a determinable fluxing temperature at which the viscosity of the elastomer is reduced, and discrete 0.3 to 70 micron particles of a cross-linkable polymer selected from the group consisting of cross-linkable organic homopolymers, copolymers, graft copolymers and blends thereof having an average viscosity molecular weight between 50,000 and 300,000, the polymer having a softening point temperature in excess of the fluxing temperature of the elastomer, the method including the steps of:
    (a) directly combining the elastomer and discrete polymer particles, and
    (b) mixing together the elastomer and polymer particles at a temperature maintained above the fluxing temperature but below the softening point temperature in a manner where the discrete polymer particles are incorporated into the elastomer and form at least a two-phase matrix material.

21. A method according to claim 20 further including the step of cross-linking the polymer before incorporation thereof into the elastomer.

22. A method according to claim 21 further including cross-linking the polymer with ionizing radiation.

23. A method according to claim 20 further including the step of mixing an elastomer cross-linking promoter into the fluxing elastomer.

24. A method according to claim 21 further including the step of adding the cross-linking promoter to the fluxing elastomer after the polymer has been added.

25. A method according to claim 24 further including the step of effectuating cross-linking of the elastomer.

26. A method according to claim 25 where said cross-linking is achieved with ionizing radiaton.

27. A method according to claim 26 further including the step of forming a homogeneous dispersion of the polymer within the elastomer.

28. A method according to claim 21 further including the steps of cross-linking the polymer before incorporation thereof into the elastomer, and adding a cross-linking promoter into the fluxing elastomer and cross-linking the elastomer.

29. The method according to claim 28 further including the steps of fabricating, the matrix material into a desired configuration and then heating and deforming the fabricated article to render it dimensinally heat unstable.

30. The method according to claim 21 further including the steps of fabricating the matrix material into a desired configuration and then heating and deforming the fabricated article to render it dimensinally heat unstable.

31. The method according to claim 29 further including the steps of fabricating the matrix material into a desired configuration and then heating and deforming the fabricated article to render it dimensinally heat unstable.

32. The method according to claim 27 further including the steps of fabricating the matrix material into a desired configuration and then heating and deforming the fabricated article to render it dimensinally heat unstable.

33. A method according to claim 20 further including the step of comminuting the cross-linkable polymer to 0.3–70 micron free-flowing, dry particles.

34. A method according to claim 33 further including the step of mixing not less than approximately 5% and not more than approximately 70% by weight polymer particles into the fluxing elastomer.

35. A soft, rubbery composition of matter comprising
    (a) an organic elastomer having a determinable fluxing temperature below approximately 75° C. where the viscosity of said elastomer is sufficiently reduced at said fluxing temperature for incorporating polymer particles therein, and
    (b) an unsolvated cross-linkage polymer selected from the group consisting of organic homopolymer, copolymer, graft copolymer or blend having a stable morphology, and an average viscosity molecular weight between 50,000 and 300,000, said plymer having a softening or crystalline transition temperature in excess of said fluxing temperature and said polymer existing as discrete 0.3 to 70 micron particles distributed within said elastomer resulting from mixing said elastomer and polymer at a temperature in excess of 75° C. but below the softening or crystalline transition temperature of said polymer,
    (c) wherein said polymer particles are discretely dispersed within said elastomer in a manner so the polymer substantially retains its original morphology.

36. A composition according to claim 35 where said polymer is a polyolefin.

* * * * *